Sept. 13, 1955 E. M. GARDINER 2,717,979
PATTERN CONTROLLED COARSE-FINE SERVOMECHANISM
Filed Sept. 18, 1951 3 Sheets-Sheet 1

INVENTOR.
EDWARD M. GARDINER
BY
Reynolds, Beach & Christensen
ATTORNEYS

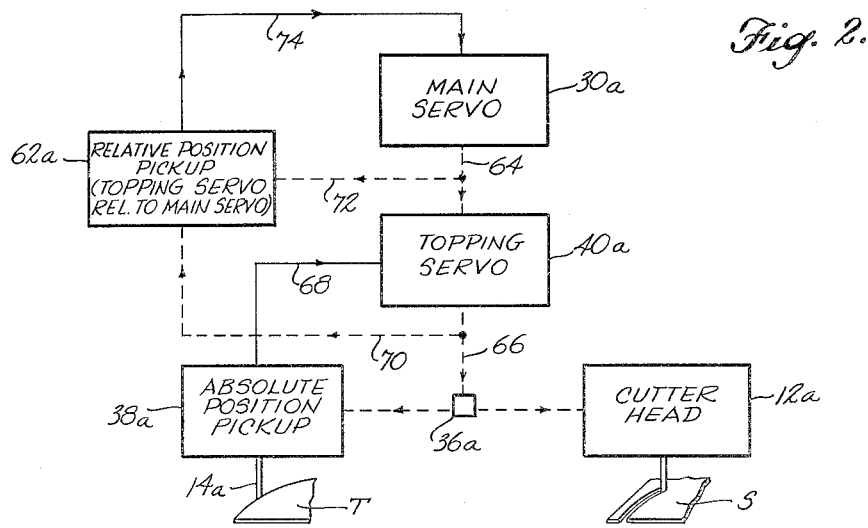
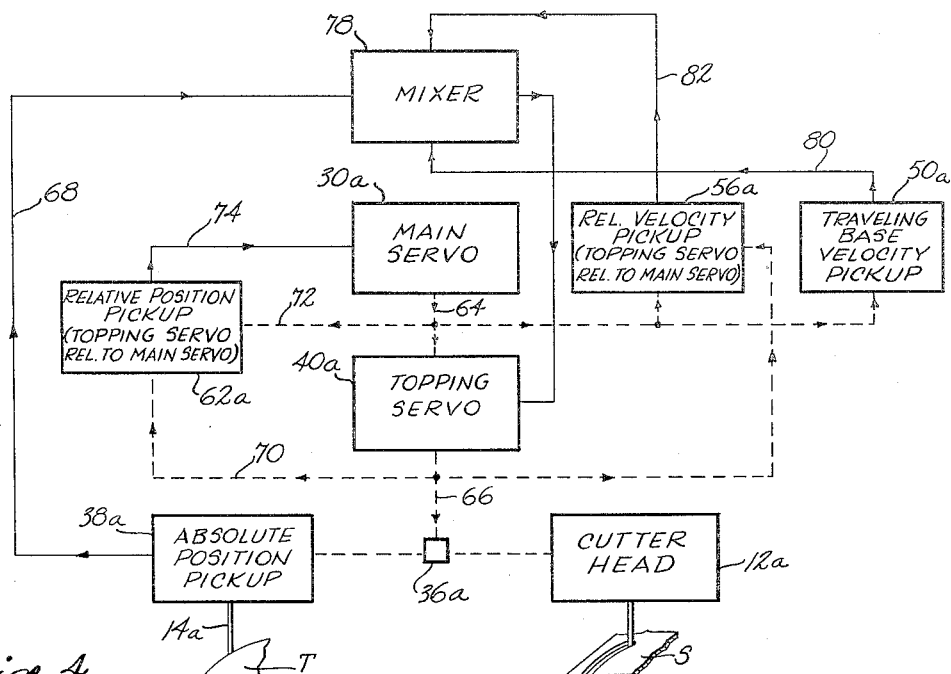

Sept. 13, 1955      E. M. GARDINER      2,717,979

PATTERN CONTROLLED COARSE-FINE SERVOMECHANISM

Filed Sept. 18, 1951      3 Sheets-Sheet 3

INVENTOR.
EDWARD M. GARDINER
BY
Reynolds, Beach & Christensen
ATTORNEYS

United States Patent Office 2,717,979
Patented Sept. 13, 1955

2,717,979

PATTERN CONTROLLED COARSE-FINE
SERVOMECHANISM

Edward M. Gardiner, Seattle, Wash., assignor to Boeing Airplane Company, Seattle, Wash., a corporation of Delaware Application September 18, 1951, Serial No. 247,063

16 Claims. (Cl. 318—19)

This invention concerns a servomechanism capable of operating at faster rates and through wider ranges of displacement than may ordinarily be attained with a given degree of accuracy in establishing a position or velocity requested of a servomechanism. The invention is herein illustratively described by reference to its application in position servos, as distinguished from velocity servos, for instance; however, it should be understood that the essentials of the invention also have direct application in other types of servos including velocity servos, and may be put to a wide variety of specific uses other than those herein mentioned for purposes of illustration.

In the manufacture of large airplane or marine vessel parts from template patterns, certain servomechanism problems arise which are typical of the type of problems with which the present invention is primarily concerned. The requirements of such a machine include the necessity of long travel distances of the tool head because of the large size of the parts, high rate of travel of the head in order to achieve high rate of production, and a high degree of accuracy sufficient, for instance, to satisfy the close tolerances customary in airplane manufacture. With ordinary or conventional servomechanisms operating characteristics calculated to satisfy the last-mentioned requirement usually reduce their ability to satisfy the first two requirements, as the difficulty of controlling such a servomechanism with precision increases with its operating speed and with its physical size and inertia. Merely increasing the power of a conventional servomotor is not a complete solution because any such increase can be accomplished usually only at the expense of greater size and mass, hence increased inertia and sluggishness of the servomotor itself; moreover, high power amplification is usually accompanied by instability problems. While the present invention is primarily concerned with servomechanisms permitting automatic duplicating machines to be increased considerably in size without loss of production volume or precision, its principles may be applied to advantage in any servomechanism application in which control accuracy is important regardless of physical size of the system.

In general, the improvement constituting the invention includes the provision of a traveling base guided for general translatory movement throughout the desired range of displacement of an operating head carried by it. The operating head in turn is guided for movement relative to the traveling base in the same sense in which the latter is movable. A main motion servomotor imparts motion to the traveling base and, within its limitations of responsiveness and accuracy resulting from its necessarily large time constant, establishes the instantaneous position and velocity, for instance, of such base in accordance with position or velocity request information received from a control source. An auxiliary or "topping" servomotor carried by the traveling base in turn imparts motion to the operating head relative to the base and thereby superimposes its movement upon that of the main motion servomotor. This topping servo has a relatively short time constant and also receives position or velocity request information depending on the type of servo involved, i. e., position or velocity, for instance. Thus the approximate control afforded by the relatively inertia-bound main motion servomotor is refined by superimposing thereon the highly responsive control action of the topping servomotor. Coordination of the two servomotors may be accomplished in various specific ways, several of which are described herein for position type servo applications. Such coordination may be accomplished, for instance, by energizing the topping servo for movement in accordance with a positional error signal derived from a pickup following along a template pattern, and energizing the main motion servomotor for movement in accordance with a signal derived from a pickup sensitive to displacement of the operating head relative to the traveling base. The coordination is such that the head is caused to remain at all times well within its limits of travel on the base while following the line of the template.

It will also be appreciated that the principle of the servomechanism carriage having a traveling base moved by a main motion servomotor, and an operating head movable on the traveling base by a topping servomotor, may be extended to include still a third servomotor coordinated therewith, either as a refinement to correct errors of the first topping servomotor or as a sub-base control to provide an even coarser degree of motion or wider-range displacement than that provided by the first main motion servomotor in the system. In other words, the principle of coordinated servomotors acting in series or tandem relationship, wherein one having a short time constant provides corrective movement superimposed upon the coarser movement of another having a long time constant, may be extended to any number of servomotors.

It will also be recognized that the principles of the invention, although herein illustrated and described by reference to a single-axis automatic control system, may be applied equally well to double-axis or multiple-axis automatic control systems, with two or more complete servomechanisms, each including a main servo and topping servo and operating independently along the different axes of the system. A multiple axis servo system of the velocity type is especially well adapted for application of the invention as will be appreciated by those skilled in the art having reference to this specification illustrating the more easily understood preferred forms of the invention.

The foregoing and other features, objects and advantages of the invention will become more fully evident from the following detailed description of illustrative forms thereof as shown in the accompanying drawings.

Figure 2 is a block diagram of a fundamental form of the improved servomechanism.

Figure 4 is a block diagram of a second modification in which velocity or rate control is additionally incorporated.

Figure 1:
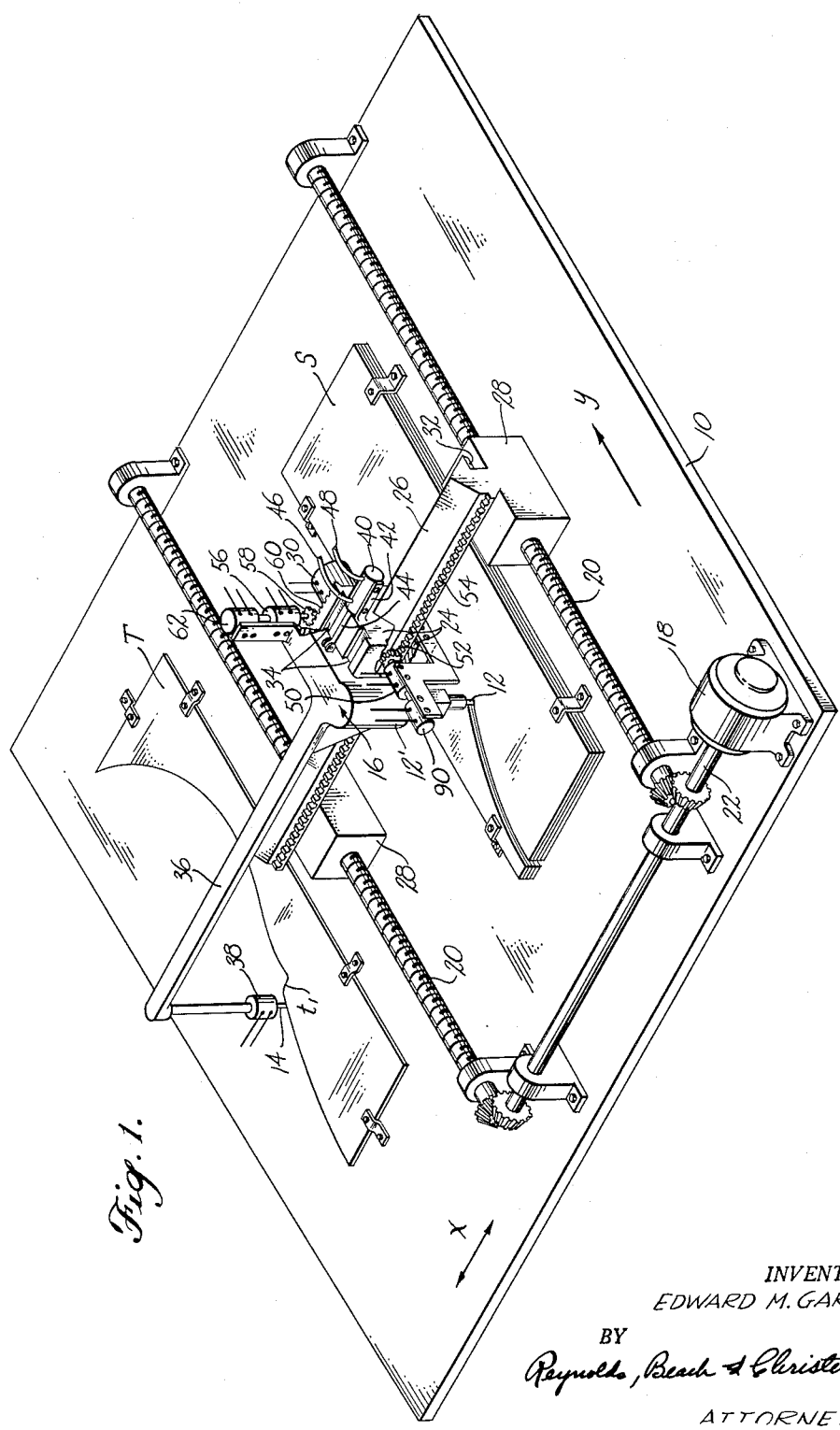
Figure 1 is a perspective view of a duplicating machine illustrated in schematic and simplified form, and being of the single-axis automatic control type.

In Figure 1 the duplicating machine base is schematically represented as a flat bed plate 10 upon which the work stock S and the template T are suitably secured at spaced locations indexed to each other such that movement of the tracking stylus 14 along the template edge or line will cause similar movement of the cutting tool 12 to duplicate the template pattern in the work stock. In the example it is assumed that the operating head 16 is automatically controlled along the transverse or "X" axis only (see arrows), and that longitudinal or "Y" axis motion is simply a constant or manually controlled feed motion effected by operation of the feed motor 18 driving the pair of feed screws 20 through the drive shaft 22 and bevel gearing as illustrated. Thus the servomechanism of present interest, as embodied in the illustrated machine, operates only in the transverse or "X"-axis direction.

The entire transverse motion carriage including the traveling base 24 and the operating head 16 thereon is supported on a transverse rail or track 26, the opposite ends of which are supported by the feed nuts 28 threaded on the feed screws 20, respectively. During the feed stroke of the machine, therefore, rotation of drive motor 18 causes the feed nuts 28 to advance at equal rates along the feed screw 20 from the left hand end of the machine in Figure 1 toward its right hand end, the transverse track 26 remaining perpendicular at all times to the direction of feed.

The traveling base 24 is movable along the track 26 by operation of the main motion servomotor 30 which drives a pinion (not shown) engaged with a gear rack 32 extending substantially the full length of the track 26, the base 24 thereby being capable of travel substantially the full distance between the feed nuts 28 if necessary. The operating head 16 in turn is mounted on the traveling base 24 by a suitable sliding connection, indicated by tongue and groove elements 34, for limited transverse movement thereon in the direction parallel to the track 26. The low-inertia operating head 16 has an arm 36 carrying the pick-up 38 by which the deflection of stylus 14 is converted into electrical signals representing positional error of the operating head in the absolute sense, that is, relative to the template line. The operating head further includes suitable means for driving the cutter tool 12, shown symbolically in the drawing as a motor 12', and in practice being a power source of low mass so that inertia of the operating head is not increased greatly thereby.

The relatively lightweight operating head 16 is moved in relation to the traveling base 24 by means of a topping servomotor 40, comprising in the example an hydraulic jack, the cylinder or casing of which is mounted on the traveling base 24 by the bracket 42, and the piston rod 44 of which is operatively connected to the operating head 16 for moving the latter in relation to the base 24 in accordance with differential pressure in the hydraulic supply lines 46 and 48. In accordance with the control apparatus to be described, signals are fed to the main motion servomotor 30, which cause the traveling base 24 to follow the general path of the template curve in the transverse sense as the carriage advances along the feed screws 20. Separate signals fed to the topping servomotor 40 constantly provide the necessary corrective increments to the actual position of the operating head 16, hence of the tool 12. Thus when the stylus 14 reaches a sharp discontinuity or break $t_1$ in the template curve, for instance, although the main motion servomotor 30 is inadequate to drive the relatively massive carriage in faithful response to the corrective signals from the pickup 38, the more quickly acting topping servo 40 driving the relatively low-inertia operating head 16 is capable of providing the desired follow-up action by very rapidly displacing the head relative to the base by the necessary amount. As the main motion servomotor is able to return the base to the correct path of travel the topping servo will restore the operating head to the initial or neutral position thereof relative to the base. Before a particular movement ceases the velocity of the head may be produced entirely by the main servo, which will be true for general movements taking place over relatively long periods of time. For small and abrupt changes of position, however, the main servo cannot gather speed in time to relieve the topping servo entirely of the necessity of operation before the particular movement is completed.

The absolute position pick-up 38 with its stylus 14 represents any control source or tracking instrumentality by which position of the operating head 16 relative to the template line is continuously converted into error signals used to control the servomechanism. Many existing pickup devices could be used for the purpose, and the particular pickup used is immaterial to this invention. For separate control purposes later to be described, a tachometer 50, carried by the traveling base, is driven by a pinion 52 engaging a gear rack 54 extending lengthwise on the track 26. Such tachometer provides a voltage proportional to velocity of the traveling base in the absolute sense, that is relative to the machine base 10. A similar tachometer 56, driven by a pinion 58 engaging a gear rack 60 extending along the side of the traveling base 24, provides a voltage proportional to velocity of the operating head 16 relative to the traveling base. A potentiometer or other positionally sensitive device 62 (such as a multiple-turn helical slide-wire and coacting sliding contact adapted to be rotated by a shaft) is rotatively connected to the shaft of the tachometer 56, as shown, to provide a voltage proportional to the instantaneous position of the operating head 16 relative to the traveling base 24, i. e. displacement thereon from a predetermined neutral. A traveling base position pickup 90 comprises a potentiometer similar to the potentiometer 62, rotated by the shaft of tachometer 50 as potentiometer 62 is rotated by the pinion 58 of tachometer 56. Some or all of these different pickup devices thus illustrated are used in each of the different forms of the control system about to be described by reference to the remaining figures.

In Figures 2 to 6, inclusive, the solid lines interconnecting the different blocks of the diagrams represent electrical or equivalent control signal channels whereas the dotted-line connections represent mechanical connections. The nature and purposes of each will be mentioned or will be obvious as the individual block diagram systems are described. Reference numerals designating particular components in Figure 1 are used with subscripts to designate similar components in the remaining figures.

With reference to Figure 2, the dotted line 64 indicates a connection for bodily movement of the topping servo 40a by the main servo 30a. The topping servo 40a in turn actuates the operating head 36a through the mechanical connection 66 to move such head relative to the traveling base which is, in effect, the main servo 30a. Control information from the absolute position pickup 38a, by which the edge or line of the template T is tracked, is fed through the channel 68 to the topping servo in corrective fashion to restore the stylus 14a on the template to electrical neutral position in the pickup, such that the cutter head 12a will follow the desired path of travel. The dotted lines 70 and 72 indicate mechanical connections by which position of the operating head 36a relative to the main servo 30a is fed to the relative position pickup 62a for conversion into a control signal, fed to the main servo 38 through the channel 74. Since for broad purposes of the invention, it is immaterial whether either or both the main servo and the topping servo be electrical, hydraulic, mechanical, electromechanical, or otherwise, the lines 68 and 74 in the diagram designate information or signal channels of a nature appropriate to the particular type of servo supplied thereby.

In the operation of the system shown in Figure 2, any departure of the stylus 14a from the electrically neutral position in the pickup 38a results in the generation of the control signal applied to the topping servo in a sense to restore the operating head 36a into correct position relative to the template line in conventional manner.

However, such movement of the operating head 36a takes place relative to the traveling base, that is, relative to the main servo 30a, and necessarily results in relative displacement therebetween. Such relative displacement is detected by the relative position pickup 62a which converts the information into a corrective signal applied to the main servo 30a in a sense tending to restore neutral positioning of the topping servo relative to the main servo. The system therefore includes two separate although related servo "loops," one being the loop including the channels 66 and 68, the operating head 36a, the absolute position pickup 38a and the topping servo 40a. The second loop includes the relative position pickup 62a, the channel 74, the main servo 30a, and the relative position channels 70 and 72. The first servo loop has the predominantly high-frequency response characteristic or small time constant, while the second servo loop has the predominantly low-frequency response characteristic or large time constant, as previously described. The second servo loop constantly energizes the main servo to move toward neutral position relative to the topping servo. As it does so, the absolute position pickup 38a provides signals to the topping servo to maintain the stylus 14a in proper position relative to the pickup 38a. Thus a suddenly occurring error signal applied to the topping servo by the absolute position pickup 38a causes rapid acceleration of the operating head 36a relative to the traveling base or main servo. There then ensues a slower acceleration of the main servo effected by the restoring signal from the relative position pickup 62a. As the main servo gathers speed the topping servo's speed relative thereto is reduced until, in the case of a continuing request for movement in the system, the main servo alone satisfies the speed requirement. If in so doing the main servo tends to produce excessive corrective motion a signal from the pickup 38a is applied to the topping servo to prevent overshoot of the cutter head past the template line, until the main servo can slow down in response to the resulting reverse-sense signal from relative position pickup 62a caused by the topping servo's action.

Figure 3:
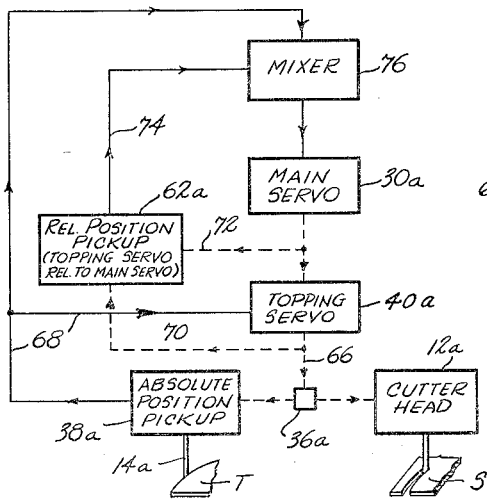
Figure 3 is a block diagram of a modification of Figure 2.

In the modification appearing in Figure 3, the only significant change from the arrangement of Figure 2 is the application of the absolute position pickup signal to a mixer 76, in which it is added to the signal from the relative position pickup 62a before application to the main servo 30a. The purpose of adding the absolute position pickup signal to the relative position pickup signal for application to the main servo is to increase the responsiveness of the main servo to move the traveling base 24 into neutral position relative to the operating head 16 immediately following sudden displacements of the operating head relative to the base. In other words, any sudden departure of the absolute position pickup from the desired template line during tracking operation, producing an error signal in the channel 68 will not only produce the usual quick-response of the topping servo to remove the error, followed by the secondary or reaction signal in the channel 74, but will provide an initial impetus signal to the main servo in the corrective sense somewhat ahead of the reaction signal in the channel 74. As a result the main motion servo begins its corrective movement somewhat ahead of the same servo in the preceding form (Figure 2) and ultimately is energized at a somewhat greater power to reduce the error, because of the additive effect of the signals in the channels 68 and 74 applied to the mixer 76. However, the signal in the channel 68 giving an initial boost to the main servo does not persist for the duration of corrective movement of the main servo relative to the topping servo under control of the relative position pickup 62a, as the topping servo is able quickly to restore the absolute position pickup into its zero error relationship to the template line and thereby eliminate the signal in channel 68. The arrangement of Figure 5 to be described also provides more immediate energization of the main servo upon occurrence of an error signal in channel 68, than in the systems of Figures 2 and 3, wherein the topping servo must undergo displacement before the main servo is energized.

In the modification appearing in Figure 4 velocity or rate correction is added to the arrangement of Figure 2. This is accomplished by passing the absolute position pickup signal in channel 68 through a mixer 78 before application to the topping servo. In the mixer 78 the absolute position pickup signal is reduced in proportion to the magnitude of two velocity signals, one the signal in channel 80 produced by the traveling base velocity pickup 50a and the other the velocity signal in channel 82 produced by the relative velocity pickup 56a. The effect of these velocity signals is to damp the absolute position signal in channel 68 before application to the topping servo, and thereby minimize overshoot of the operating head 36a caused either by excessive velocity of the operating head relative to the base or by excessive velocity of the base in the absolute sense, as the head approaches position of registry with the template line. The use of velocity or rate damping in conventional servomechanisms is standard practice, and its application as in Figure 4 to the present type of servomechanism is thus governed basically, at least, by well known considerations although complicated, of course, by the superimposed motions of two separate servomotors having materially different time constants. The senses or relative polarity of the different signals fed to the mixer 78 may be seen by reference to Figure 5 in which the block diagram shows two mixers (77 and 79) for the one in Figure 4 in an electrically equivalent arrangement insofar as that portion of the two systems is concerned.

Figure 5:
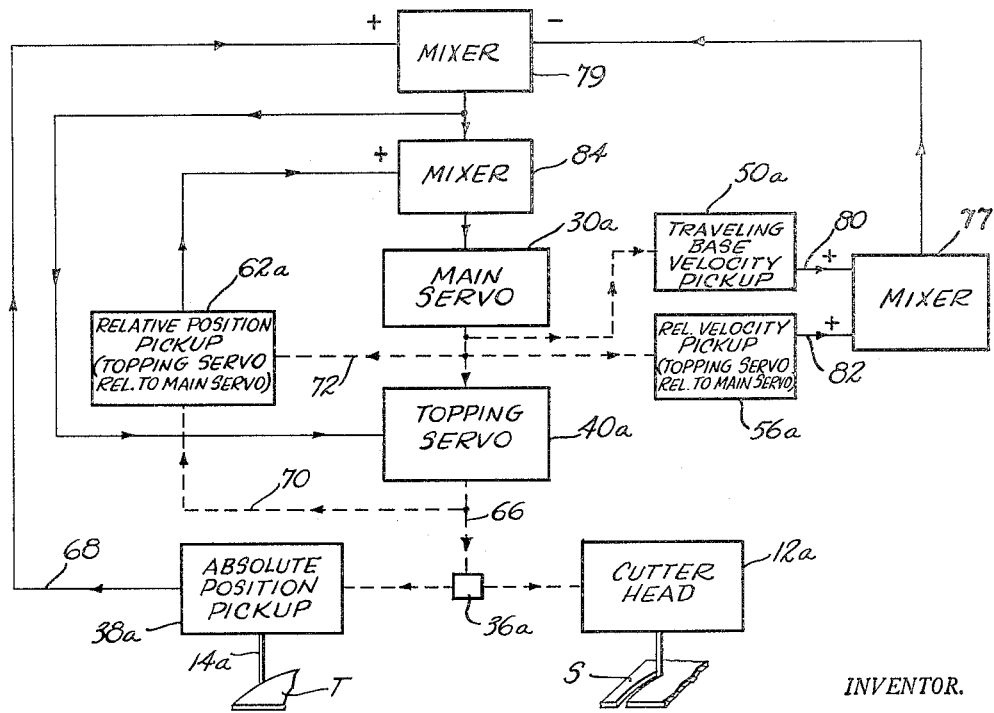
Figure 5 is a block diagram of a third modification.

In the modification appearing in Figure 5 velocity and positional error signals are combined to stabilize the main servo's velocity as quickly as possible at that requested of the system, i. e. from the absolute position pickup. Thus instead of feeding merely a relative position pickup signal to the main servo as in Figure 4, the system of Figure 5 utilizes, for instance, a relative position pickup signal combined with a velocity request signal to permit the topping servo to return to its central position more quickly than in the form shown in Figure 4. The control signal actually applied to the main servo by mixer 84 in Figure 5 is the sum of the relative position pickup signal and a velocity request signal from mixer 79, the latter signal representing the difference of the absolute position pickup signal and absolute or cutterhead velocity signal. The cutterhead velocity signal just mentioned is obtained by adding together in mixer 77 signals proportional to velocity of the traveling base and to velocity of the cutterhead relative to the traveling base, from pickups 50a and 56a, respectively.

The mode of operation in Figure 5 may be appreciated by considering the effect of an error signal from absolute position pickup 38a fed to mixer 79 when the system is at rest and the topping servo is at neutral in respect to the main servo or traveling base. Such a signal then passes through mixer 79 unaltered, for direct application to both mixer 84 and the topping servo 40a. Because the topping servo is in centered position at first, this signal also passes through mixer 84 unaltered, for direct application to the main servo. Thus, both servos receive the same signal initially, whether or not at the same energy level, and both are set into motion thereby at the outset. However, the topping servo accelerates much more rapidly than the main servo because of its shorter time constant, and the resulting relative velocity signal from pickup 56a will at first be large in relation to the traveling base velocity signal from pickup 50a.

Consequently, the output of mixer 77 is primarily proportional to the velocity of the topping servo relative to the traveling base or main servo during the initial period of response of the system to a signal from absolute position pickup 38a under the assumed conditions stated above. The signal fed to the topping servo from mixer 79 tends almost immediately to stablize the topping servo at a velocity relative to the traveling base which approximates that requested from the absolute position pickup. However, while this is taking place, the position of the topping servo on the traveling base is changing, which is reflected in a proportional signal from the relative position pickup. By combining the signal from relative position pickup 62a with the signal from mixer 79, which latter signal may be termed an "absolute speed-error signal," the main servo will be energized to move progressively faster as the topping servo moves away from central position to satisfy a velocity request. Feeding the relative position pickup signal to the mixer 84 causes the main servo to travel ultimately at a velocity greater than that actually requested of it from the absolute position pickup 38a. This necessitates a reversal of movement of the topping servo relative to the traveling base before the absolute position pickup signal becomes zero. Such reverse movement of the topping servo continues until the relative position pickup signal becomes zero, which occurs when the main servo is then traveling at a velocity corresponding to the signal produced from the absolute position pickup.

It will be seen, therefore, that the system of Figure 5 is capable of producing a rapid response of the main servo itself to a velocity request, and consequently that there is less likelihood of the topping servo ever being required to reach the limits of its travel on the traveling base even under the most severe conditions of tracking by the system.

Figure 6:
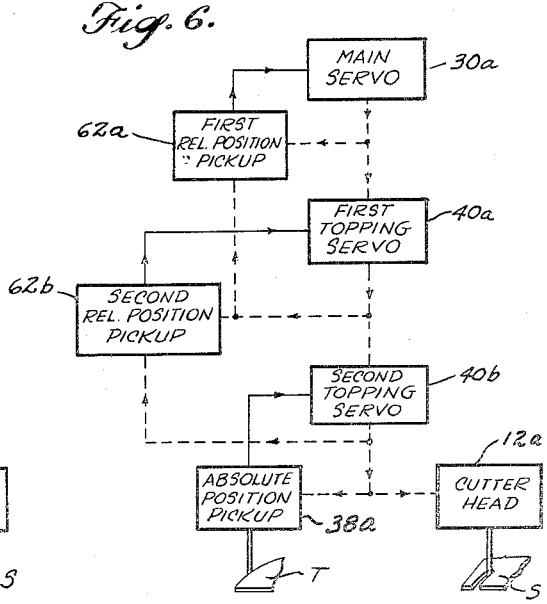
Figure 6 is a block diagram of a servomechanism similar to Figure 2, but illustrating the principle of the system extended to include three servomotors arranged in series.

The arrangement appearing in Figure 6 illustrates the adaptation of the fundamental arrangement in Figure 2 to the case of three servomotors arranged to act in series in a complete system. As indicated and labelled in the diagram, the main motion servomotor provides the main translatory movement of the system, the first topping servomotor provides an intermediate degree of motion and accuracy in the positioning of the cutter head, and the second topping servo applies the ultimate, finer degree of motion and accuracy in the positioning of the cutter head. The second topping servo has a high-frequency response characteristic above that of the first topping servo, which in turn is above that of the main servo. A first relative position pickup restores the first topping servo to a neutral position in relation to the main servo, and a second relative position pickup restores the second topping servo to a neutral position relative to the first topping servo. The signal from the absolute position pickup is applied directly to the second topping servo to cause the entire system to follow the template line.

Instead of one or two topping servomotors being used in the system any number thereof, symbolized generally by the integer *n* may be used, by a direct extension of the principles already indicated with reference to the different figures.

I claim as my invention:

1. A servomechanism operable to move an operating instrumentality in accordance with a control signal, comprising a base guided for movement in a predetermined sense, a main motion servomotor operable to move said base in accordance with energization of such servomotor, moving means carrying the operating instrumentality and in turn carried by said base for movement relative thereto in said predetermined sense, said moving means comprising *n* moving elements where *n* is any integer including one, the first such element being carried by and being guided for movement in relation to said base in said predetermined sense, and any succeeding such elements being in turn carried by and guided for movement with relation to those immediately preceding them, respectively, in the same sense, the last element in the series carrying the operating instrumentality, *n* topping servomotors, one of said topping servomotors being carried by said base to move the first element in the series in said predetermined sense, and any additional such topping servomotors being operable to move any succeeding moving elements of the series being in turn carried by the moving elements next preceding them, respectively, control means effecting energization, in accordance with a control signal, of the last topping servomotor which directly moves said last moving element, and coordinating means operatively effecting energization of the main motion servomotor and any topping servomotors in addition to said last topping servomotor, for restoring said base into predetermined positional relationship to the moving element directly carried thereby, and for restoring said last-mentioned and any additional moving elements into predetermined positional relationship to any succeeding moving elements which they in turn directly carry, respectively.

2. The servomechanism defined in claim 1, wherein the coordinating means comprises a first relative position pickup controlling energization of the main motion servomotor in accordance with departures from predetermined relative positions of the base and first moving element in the series, and as many additional relative position pickups as there are additional moving elements in the series, controlling energization of the corresponding additional topping servomotors except the last servomotor in the series, in accordance with departures between such additional moving elements from predetermined positional relationship thereof with the moving elements next preceding them, respectively.

3. A servomechanism operable to move an operating head in accordance with a control signal, comprising a traveling base guided for movement in a predetermined sense, means on said base supporting and guiding the operating head for movement relative thereto in the same sense, a main motion servomotor operable to motivate said base, a topping servomotor carried by said base and operable to motivate the operating head relative thereto, control means effecting energization of said topping servomotor in accordance with a control signal, and further control means coordinated with said first-mentioned control means simultaneously effecting energization of said main motion servomotor in a sense driving said base toward predetermined positional relationship with the operating head carried thereby.

4. The servomechanism defined in claim 3, wherein the time-constants of the respective servomotors under load differ materially one from another.

5. The servomechanism defined in claim 4, wherein the further control means includes relative position pickup means sensitive to departure of the base and operating head from predetermined positional relationship and mixer means combining signals from the relative position pickup and the first-mentioned control means, for controlling energization of the main motion servomotor.

6. The servomechanism defined in claim 4, wherein the first-mentioned control means comprises means producing a control signal constituting a request for movement by the servomechanism, means producing a signal corresponding to velocity of the traveling base, means producing a signal corresponding to velocity of the operating head relative to the traveling base, and mixer means combining such control signal, traveling base velocity signal and operating head relative velocity signal for controlling energization of the topping servomotor thereby.

7. The servomechanism defined in claim 6, wherein the further control means comprises mixer means combining the relative position pickup signal and first-mentioned mixer means output signal for controlling energization of the main motion servomotor thereby.

8. The servomechanism defined in claim 4, wherein the main motion servomotor comprises motor means and gear means driven thereby and rack means engaged by said gear means to effect movement of the traveling base over large distances and the topping servomotor comprises quick-acting hydraulic piston and cylinder means to effect relative movement of the operating over relatively short distances.

9. A duplicating machine comprising an operating head including cutting means and a positional pickup cooperative with a template to provide tracking error signals in response to departures from the template line, and servomechanism operable to move said operating head in accordance with such error signals, comprising a traveling base guided for movement in a predetermined sense related to the template, means on said base supporting and guiding said operating head for movement relative thereto in the same sense, a main motion servomotor operable to motivate said base, a topping servomotor carried by said base and operable to motivate the operating head relative thereto, control means energizing said topping servomotor in accordance with said control signals, and coordinating means simultaneously operable to energize said main motion servomotor for restoring said base into predetermined positional relationship to the operating head carried thereby, said coordinating means including relative position pickup means sensitive to departures of said base and operating head from predetermined positional relationship.

10. Automatic tracking mechanism comprising a main motion servomotor operable to effect translatory motion in a predetermined directional sense, a tracking head, a topping servomotor movable bodily in translation by said main motion servomotor and in turn operable to effect movement of said tracking head in said predetermined sense superimposed on the bodily movement of said topping servomotor, control means including a pickup device arranged to follow a predetermined track and movable with said tracking head, said pickup device producing a tracking error signal controlling energization of said topping servomotor correctively to position said tracking head along such predetermined track, and coordinating means sensitive to instantaneous relative displacement of said tracking head effected by said topping servomotor alone and controlling energization of said main motion servomotor in response thereto for restoring said topping servmotor into predetermined bodily position relative to the track.

11. Automatic tracking mechanism operable to follow a given track comprising a main motion servomotor operable to effect translatory motion in a predetermined directional sense, a tracking head including a pick-up cooperative with the track for producing control signals accompanying departures of said head relative to the track, a topping servomotor movable bodily in traslation by said main motion servomotor and in turn operable to effect movement of said tracking head in said predetermined sense superimposed on the bodily movement of said topping servomotor, means responsive to said control signal controlling energization of said topping servomtor to reduce existing departure of said tracking head relative to the track causing such control signal, coordinating means sensitive to the resulting departure-reducing instantaneous displacement of said tracking head effected by said topping servomotor alone and simultaneously controlling energization of said main motion servomotor in response to such displacement for reducing such displacement by moving said topping servomotor bodily into predetermined bodily position relative to the track, and means responsive to said control signal effecting energization of said main motion servomotor ahead of said coordinating means and additively in relation thereto.

12. Automatic tracking mechanism comprising a main motion servomotor, a topping servomotor having a materially smaller time constant than said main motion servomotor and carried for relatively wide-range bodily movement effected by said main motion servomotor in a predetermined directional sense, absolute position pickup means carried for relatively short-range movement effected by said topping servomotor superimposed on bodily movement of the latter effected by said main motion servomotor, and relative position pickup means carried for bodily movement effected by said main motion servomotor and arranged to sense instantaneous displacement of said absolute position pickup means effected by said topping servomotor alone, said relative position pickup controlling energization of said main motion servomotor and said absolute position pickup controlling energization of said topping servomotor and effecting supplemental energization of said main motion servomotor.

13. A servomechanism operable to move an operating head in accordance with a control signal subject to variation, comprising a traveling base guided for movement in a predetermined sense through a relatively large range, means carried bodily by said base supporting and guiding the operating head for movement relative thereto in the same sense through a relatively small range, a main motion servomotor operable to motivate said base through said relatively large range of movement, a topping servomotor carried by said base and operable to motivate the operating head relative thereto through said relatively small range of movement, means connected to said operating head for producing an externally influenced control signal related to the instantaneous absolute position of said head, means continuously responsive to said signal-producing means effecting energization of said topping servomotor in a sense to reduce said control signal by movement of said head, and coordinating means including a relative position signal generator continuously responsive to displacement of said head relative to said base from a predetermined positional relationship therewith, and means effecting energization of said main motion servomotor in a sense to reduce such relative position signal for restoring said base into predetermined positional relationship to the operating head carried thereby.

14. Automatic tracking mechanism comprising a tracking head having a pick-up device operable to produce a control signal responsively to deviations of said pick-up from a predetermined line-track, a traveling base guided for movement in a sense to permit following said track through a relatively large range, means carried bodily by said base supporting and guiding said tracking head for movement relative thereto in the same sense through a relatively small range, a main motion servo operable to motivate said base through said relatively large range of movement, a topping servo carried by said base and operable to motivate said tracking head relative thereto through said relatively small range of movement, means continuously responsive to said pick-up device control signal effecting energization of said topping servo in a sense effecting a reduction of such control signal by movement of said tracking head relative to said base, and means automatically energizing said main motion servo in a sense tending to restore said traveling base into predetermined positional relationship with said tracking head and to the line-track.

15. Servomechanism comprising a controlled head, means to produce a control signal subject to variation, a traveling base guided for movement in a predetermined sense through a relatively large range, means carried bodily by said base supporting and guiding said head for movement relative thereto in the same sense through a relatively small range, a main motion servo operable to motivate said base through said relatively large range of movement, a topping servo carried by said base and operable to motivate said head relative thereto through said relatively small range of movement, means continuously responsive to said signal-producing means effecting energization of said topping servo in a sense effecting a reduction of such control signal by movement of said head relative to said base, and means automatically energizing said main motion servo in a sense tending to restore said traveling base into predetermined positional relationship with said head.

16. Servomechanism comprising a controlled element, a relatively quick-acting servomotor connected to said element and energizable to produce movement thereof in a predetermined sense through a relatively short range, said servomotor having a base movable in said sense, a relatively slow-acting servomotor movingly connected to said quick-acting servomotor base and energizable to move said quick-acting servomotor and thereby said controlled element bodily in said sense through a relatively long range, means for producing a control signal reducible by movement of said controlled element in a predetermined sense, means responsive to said control signal for energizing said quick-acting servomotor to effect displacement of said controlled element in said signal-reducing sense by displacement of said element relative to said servomotor base, and means coordinated with said signal-producing means simultaneously energizing said slow-acting servomotor for moving said quick-acting servomotor bodily in a sense tending to reduce said signal-produced displacement between said servomotor base and said controlled element independently of signal-controlled absolute displacement of said controlled element being established by said quick-acting servomotor.

References Cited in the file of this patent

UNITED STATES PATENTS

| | | |
|---|---|---|
| 1,123,067 | Barkhausen et al. | Dec. 29, 1914 |
| 1,788,670 | Granat | Jan. 13, 1931 |
| 1,985,982 | Edwards | Jan. 1, 1935 |
| 2,116,593 | Bouvier et al. | May 10, 1938 |
| 2,410,295 | Kuehni et al. | Oct. 29, 1946 |
| 2,437,603 | Hornfeck | Mar. 9, 1948 |
| 2,494,663 | Lobosco | Jan. 17, 1950 |
| 2,494,922 | Yardney | Jan. 17, 1950 |
| 2,588,742 | McCallum | Mar. 11, 1952 |
| 2,634,387 | Mercier | Apr. 7, 1953 |